US010554043B2

(12) United States Patent
Sinreich

(10) Patent No.: US 10,554,043 B2
(45) Date of Patent: Feb. 4, 2020

(54) POWER MANAGEMENT CIRCUIT FOR WIRELESS COMMUNICATION DEVICE AND PROCESS CONTROL SYSTEM USING SAME

(71) Applicant: Pepperl+Fuchs GMBH, Mannheim (DE)

(72) Inventor: Mark Sinreich, Akron, OH (US)

(73) Assignee: Pepperl + Fuchs GmbH, Mannheim (DE)

( * ) Notice: Subject to any disclaimer, the term of this patent is extended or adjusted under 35 U.S.C. 154(b) by 0 days.

(21) Appl. No.: 15/644,251

(22) Filed: Jul. 7, 2017

(65) Prior Publication Data

US 2017/0331286 A1    Nov. 16, 2017

Related U.S. Application Data

(63) Continuation of application No. 13/699,107, filed as application No. PCT/US2011/029877 on Mar. 24, 2011, now Pat. No. 9,735,570.

(Continued)

(51) Int. Cl.
*H02J 1/00* (2006.01)
*H02J 7/34* (2006.01)
(Continued)

(52) U.S. Cl.
CPC ...... *H02J 1/00* (2013.01); *H02J 1/10* (2013.01); *H02J 7/345* (2013.01);
(Continued)

(58) Field of Classification Search
CPC ...... H02J 1/00; H02J 1/06; H02J 7/345; H02J 1/10; G05B 19/0423; G05B 2219/33192; G05B 2219/25428
See application file for complete search history.

(56) References Cited

U.S. PATENT DOCUMENTS 5,959,372 A    9/1999  Every
5,977,749 A   11/1999  Kim
(Continued)

FOREIGN PATENT DOCUMENTS

WO    2006/025918    3/2006
WO    2008/0157389   12/2008
WO    2008/0157391   12/2008

OTHER PUBLICATIONS

PCT, International Search Report and Written Opinion, Patent Application No. PCT/US11/29877 (dated May 27, 2011).
(Continued)

*Primary Examiner* — Charles R Kasenge
(74) *Attorney, Agent, or Firm* — Muncy, Geissler, Olds & Lowe, P.C.

(57) ABSTRACT

A system including a current loop in serial connection with a field device is disclosed. The system includes a power management circuit connected in serial with the current loop and configured to cause a regulated voltage drop across the serial connection at an insertion voltage. The power management circuit is configured to output an electrical power derived from the insertion voltage. The power management circuit includes an energy pump, a control circuit, and a power consuming circuit. The energy pump is a voltage converter that receives a first voltage and converts the first voltage to a second voltage that is either higher or lower than the first voltage. The energy pump includes an input for receiving at least a portion of the insertion voltage and an feedback input for accepting a feedback sense.

21 Claims, 3 Drawing Sheets

Related U.S. Application Data

(60) Provisional application No. 61/371,031, filed on Mar. 24, 2010.

(51) Int. Cl.
*H02J 1/10* (2006.01)
*G05B 19/042* (2006.01)

(52) U.S. Cl.
CPC .............. *G05B 19/0423* (2013.01); *G05B 2219/25428* (2013.01); *G05B 2219/33192* (2013.01)

(56) References Cited

U.S. PATENT DOCUMENTS

| | | | |
|---|---|---|---|
| 6,304,978 B1 | 10/2001 | Horigan et al. | |
| 6,677,824 B2 | 1/2004 | Harpham | |
| 7,194,363 B2 | 3/2007 | Schaffer et al. | |
| 7,262,693 B2* | 8/2007 | Karschnia | G05B 19/4185 340/508 |
| 7,358,744 B2 | 4/2008 | Scholz | |
| 7,593,642 B2 | 9/2009 | Loechner | |
| 7,911,189 B2* | 3/2011 | Seberger | H02M 3/155 307/39 |
| 7,956,738 B2* | 6/2011 | Karschnia | G05B 19/4185 340/538 |
| 8,005,514 B2 | 8/2011 | Saito et al. | |
| 8,145,180 B2* | 3/2012 | Brown | G05B 19/4185 455/343.1 |
| 8,160,535 B2 | 4/2012 | Kielb et al. | |
| 8,258,749 B2* | 9/2012 | Sinreich | G05B 19/0423 320/128 |
| 8,280,317 B2 | 10/2012 | Sinreich | |
| 8,787,848 B2* | 7/2014 | Kielb | G01D 21/00 455/117 |
| 2001/0001013 A1 | 5/2001 | Scott et al. | |
| 2001/0017572 A1 | 8/2001 | Harpham | |
| 2002/0198648 A1 | 12/2002 | Gilbreth et al. | |
| 2003/0075993 A1 | 4/2003 | Fadell et al. | |
| 2004/0151034 A1 | 8/2004 | Shor et al. | |
| 2004/0158334 A1 | 8/2004 | Kirkpatrick et al. | |
| 2005/0137812 A1 | 6/2005 | Schaffer et al. | |
| 2005/0208908 A1 | 9/2005 | Karschnia et al. | |
| 2005/0245291 A1 | 11/2005 | Brown et al. | |
| 2005/0289276 A1 | 12/2005 | Karschnia | |
| 2006/0092039 A1 | 5/2006 | Saito et al. | |
| 2006/0290328 A1 | 12/2006 | Orth | |
| 2006/0291438 A1 | 12/2006 | Karschnia et al. | |
| 2007/0063833 A1 | 3/2007 | Kates | |
| 2007/0108925 A1 | 5/2007 | Scholz | |
| 2007/0285224 A1* | 12/2007 | Karschnia | G05B 19/4185 340/538 |
| 2008/0280568 A1* | 11/2008 | Kielb | G01D 21/00 455/74.1 |
| 2009/0015216 A1 | 1/2009 | Seberger et al. | |
| 2009/0094466 A1 | 4/2009 | Matthew et al. | |
| 2009/0146502 A1 | 6/2009 | Sinreich | |
| 2009/0253388 A1* | 10/2009 | Kielb | G01D 21/00 455/117 |
| 2009/0309558 A1 | 12/2009 | Kielb | |
| 2010/0061733 A1 | 3/2010 | Loechner | |
| 2012/0326525 A1 | 12/2012 | Seinrich | |
| 2013/0029533 A1 | 1/2013 | Sinreich | |
| 2013/0107919 A1 | 5/2013 | Burns et al. | |

OTHER PUBLICATIONS

CN, Notification of the First Office Action (with English translation), Chinese Application No. 20118002086.X, 35 pages, dated Dec. 31, 2014.

EU, European Search Report and Opinion, European Patent Application No. 11760264.9 (dated Aug. 26, 2015).

U.S., Non-Final Office Action, U.S. Appl. No. 13/699,107 (dated Jul. 22, 2015).

U.S., Non-Final Office Action, U.S. Appl. No. 13/699,107 (dated May 16, 2016).

U.S., Notice of Allowance, U.S. Appl. No. 13/699,107 (dated Dec. 23, 2016).

U.S., Notice of Allowance, U.S. Appl. No. 13/699,107 (dated Apr. 7, 2017).

* cited by examiner

POWER MANAGEMENT CIRCUIT FOR WIRELESS COMMUNICATION DEVICE AND PROCESS CONTROL SYSTEM USING SAME

REFERENCE TO RELATED APPLICATIONS

The present application is a continuation of U.S. application Ser. No. 13/699,107, filed Nov. 20, 2012, which is the national phase entry of International Application No. PCT/US2011/029877, filed Mar. 24, 2011, which claims priority of U.S. Provisional Application Ser. No. 61/317,031, filed Mar. 24, 2010. The present application is related to U.S. Provisional application Ser. No. 61/315,387, filed Mar. 18, 2010, U.S. Provisional Application Ser. No. 60/937,396, filed Jun. 26, 2007, U.S. Provisional Application Ser. No. 60/937,397, filed Jun. 26, 2007, U.S. Provisional Application Ser. No. 61/012,262 filed Dec. 7, 2007, and U.S. patent application Ser. No. 12/147,469 filed Jun. 26, 2008 (now U.S. Pat. No. 8,258,749, issued Sep. 4, 2012).

TECHNICAL FIELD

The systems and methods relate generally to the field of process control systems. More specifically, the disclosed systems and methods relate to devices, systems and methods for transmitting and receiving telemetry data with field devices that utilize process control loops.

BACKGROUND

Conventional process control systems generally include basic components for sensing, measuring, evaluating, and adjusting or otherwise controlling a variety of process variables. Additionally, common systems include components that provide means for communicating information about process control variables between sensing, measuring, or adjusting components and evaluation components. One such system for communicating information is a two-wire system that creates a loop that physically connects a sensing, measuring, evaluating, or adjusting device to a controller.

Sensing, measuring, evaluating, and/or adjusting devices in industrial production environments are generally referred to as field devices. Field devices commonly sense or monitor one or more process control variables such as temperature, pressure, or rate of fluid flow, among others. Many of these field devices can communicate information about the sensed or monitored variable to a process controller by regulating electrical current on the two-wire system. The controller in this type of environment can sense the electrical current, such as by using a current sense resistor, and translate the sensed magnitude of the current, as well as any sensed change of the current, into information about the sensed or monitored control variable. Many common field devices can receive information from the controller and effect changes or adjustments to the sensed or monitored control.

Two methods of communicating information using a multi-wire loop system include analog signaling methods, such as communicating information via an analog current signal, and digital signaling methods that can communicate information as a frequency shift keyed carrier signal which can be superimposed on, and coexist with, an analog signaling method on the multi-wire loop. One digital signaling method is the Highway Addressable Remote Transducer ("HART") communications protocol from the HART® Communication Foundation. As referred to herein, HART refers to any past or present version of the HART protocol, including Wireless HART, variants of such versions, as well as any future version that may be created so long as those future versions are compatible or can be modified to be compatible with the systems and methods disclosed herein.

SUMMARY

A system including a current loop in serial connection with a field device is disclosed. The system includes a power management circuit connected in serial with the current loop, and is configured to cause a regulated voltage drop across the serial connection at an insertion voltage. The power management circuit is configured to output an electrical power derived from the insertion voltage. The power management circuit includes an energy pump, a control circuit, and a power consuming circuit. The energy pump is a voltage converter that receives a first voltage and converts the first voltage to a second voltage that is either higher or lower than the first voltage. The energy pump includes an input for receiving at least a portion of the insertion voltage and an feedback input for accepting a feedback sense. The energy pump outputs a charging voltage based at least in part on the feedback sense, and the charging voltage is configured to source the electrical power output by the power management circuit. The control circuit regulates the insertion voltage by modulating the feedback sense to the energy pump. The control circuit modulates the feedback sense at least partially in response to an electrical change in the current loop. The power consuming circuit is in communication with the power management circuit to receive the electrical power.

In another embodiment, a method for managing power to a field device and a wireless communication device is disclosed. The method comprises receiving a DC voltage from a battery. The battery is configured to provide a loop current to the field device. The method further includes converting the DC voltage to a charging voltage, where the converting is selectively disabled during an operation of measuring a loop current of the field device. The method also includes delivering the charging voltage to an electrical storage element. The method includes storing the charging voltage as a stored power in the electrical storage element for delivery to the wireless communication device. Finally, in response to the electrical storage element reaching maximum capacity, the method includes bypassing, by a voltage shunting circuit in parallel with the electrical storage element, current and power to prevent voltage across the electrical storage element from further increasing.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Most components and methods disclosed are described with reference to the drawings. In drawings, like reference numbers are used to refer to like elements throughout the drawings. In the following description, to aid in explanation, a number of specific details are provided to promote understanding of the disclosed subject matter. It may be evident, however, that certain of these specific details can be omitted or combined with others in a specific implementation. In other instances, certain structures and devices are shown in block diagram form in order to facilitate description. Further, it should be noted that although specific examples presented can include or reference specific components, a specific implementation of the components and methods disclosed and described is not necessarily limited to those specific examples and can be employed in other contexts as well. Those of ordinary skill in the art will readily recognize that the disclosed and described components and methods can be used to create other components and execute other methods in a wide variety of ways.

Figure 1:
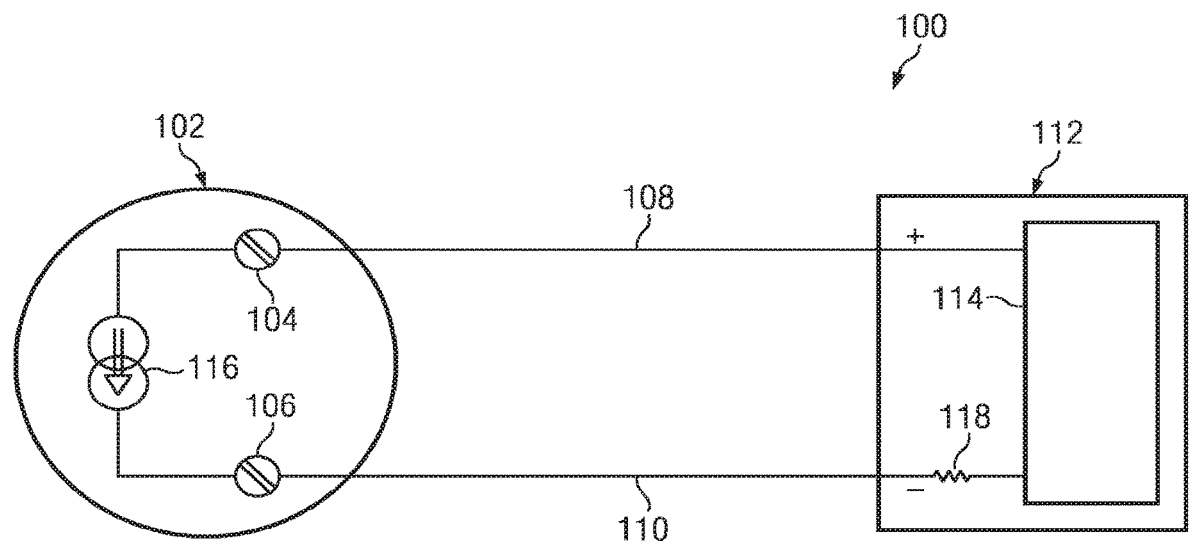
FIG. 1 is a system block diagram of a process control loop.

FIG. 1 is a system block diagram of a process control system 100. As illustrated, a field device 102 can include connection terminals 104, 106 to which control loop wires 108, 110 can be connected. A controller 112 can include a power supply 114 that is operable to supply electrical current (e.g., loop current) and voltage to the control loop wires 108, 110. In particular, a positive terminal of the power supply 114 can be in electrical communication with the control loop wire 108 and a negative terminal of the power supply 114 can be in electrical communication with the control loop wire 110. In one embodiment, the power supply 114 can produce loop current magnitudes levels from approximately 3.5 mA to approximately 20 mA during normal operation, with maximum current values as high as approximately 130 mA during maximum fault conditions. However, any of a variety of other current or voltage ranges may be provided by the power supply, such as may correspond with voltage and current parameters for a particular field device, for example.

In one embodiment, as illustrated in FIG. 1, the field device 102 can include a current regulator 116 that is operable to change amounts of loop current provided through the control loop wires 108, 110. Using the current regulator 116, the field device 102 can regulate the amounts of electrical current to communicate a control process variable to the controller 112. For example, if the field device 102 is configured to sense temperature, the current regulator 116 can regulate the amounts of current provided through the control loop wires 108, 110 to indicate the monitored temperature. It will be appreciated that any of a variety of suitable alternative embodiments can indicate a control process variable in the field device such as, for example, a current shunt, a voltage shunt, or the like.

In order to communicate the amount of current to the controller 112, in one embodiment, the controller 112 can include a current sense resistor 118 which can operate to sense the loop current provided through the control loop wires 108, 110. However, it will be appreciated that the controller 112 can sense loop current or other variables in any of a variety of suitable alternative configurations. Additionally or alternatively, the process control system 100 can include digital signaling components (not shown) to facilitate the communication of information as a carrier signal on the control loop wires 108, 110. In one embodiment, the field device 102 can include Highway Addressable Remote Transducer ("HART") communication components, such as wireless HART communication components. However, the process control system can include components for any of a variety of suitable alternative communication protocols such as, for example, ISA SP100 and Fieldbus among others.

Figure 2:
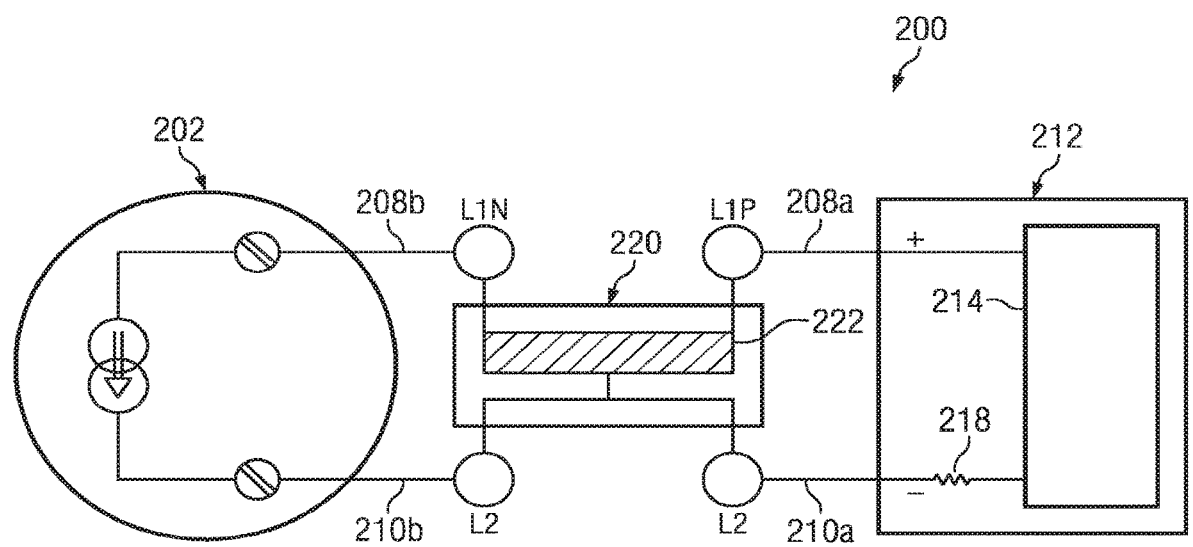
FIG. 2 is a system block diagram of a process control loop.

It will be appreciated that the process control system 100 can communicate with an associated network to provide information to a host controller. Conventionally, the controller 112 communicates with the associated network via wired communication. However, in some embodiments, the controller 112 may not support wired communication with the network (e.g., when digital signaling equipment is not present on the controller 112 or during failure of certain digital signaling equipment). Therefore, in one embodiment, as illustrated in FIG. 2, a wireless adapter device 220 can be included. As will be described in more detail below, the wireless adapter device 220 can include components and circuitry that are configured to provide wireless radio frequency ("RF") communications with an RF-based network in a facility that can communicate with a controller 212 or other suitable controllers. The wireless adapter device 220 can function as a gateway between components that can provide digital signaling for a field device 202 and a wireless communication network (not shown) in a facility. The controller 212 can be the controller 112 of FIG. 1 or as another suitable controller. The field device 202 can be the field device 102 depicted and described in FIG. 1 or can be another suitable field device.

Conventionally, the wireless adapter device 220 can be powered by dedicated power sources such as, for example, a separate wired power circuit, a battery, or a solar power cell, among others. However, installation and maintenance of a wireless adapter device 220 powered by these dedicated power sources can be costly and time consuming. Therefore, as illustrated in FIG. 2, the wireless adapter device 220 can provided in electrical communication with the control loop wires 208a, 208b, 210a, 210b such that the wireless adapter device 220 can be powered from loop current through the control loop wires 208a, 208b, 210a, 210b. In such an embodiment, the wireless adapter device 220 can include a power management circuit 222 provided between nodes L1P and L1N which can be connected in series with the control loop wires 208a and 208b. As described in more detail below, insertion power can be provided to the power management circuit 222 to power the wireless adapter device 220 without substantially interfering with the loop current. Accordingly, the wireless adapter device 220 can be powered by the process control system 200 without hindering the field device 202 from communicating a control process variable to the controller 212 (e.g., via current on loop wires 208a, 208b, 210a, 210b).

Figure 3:
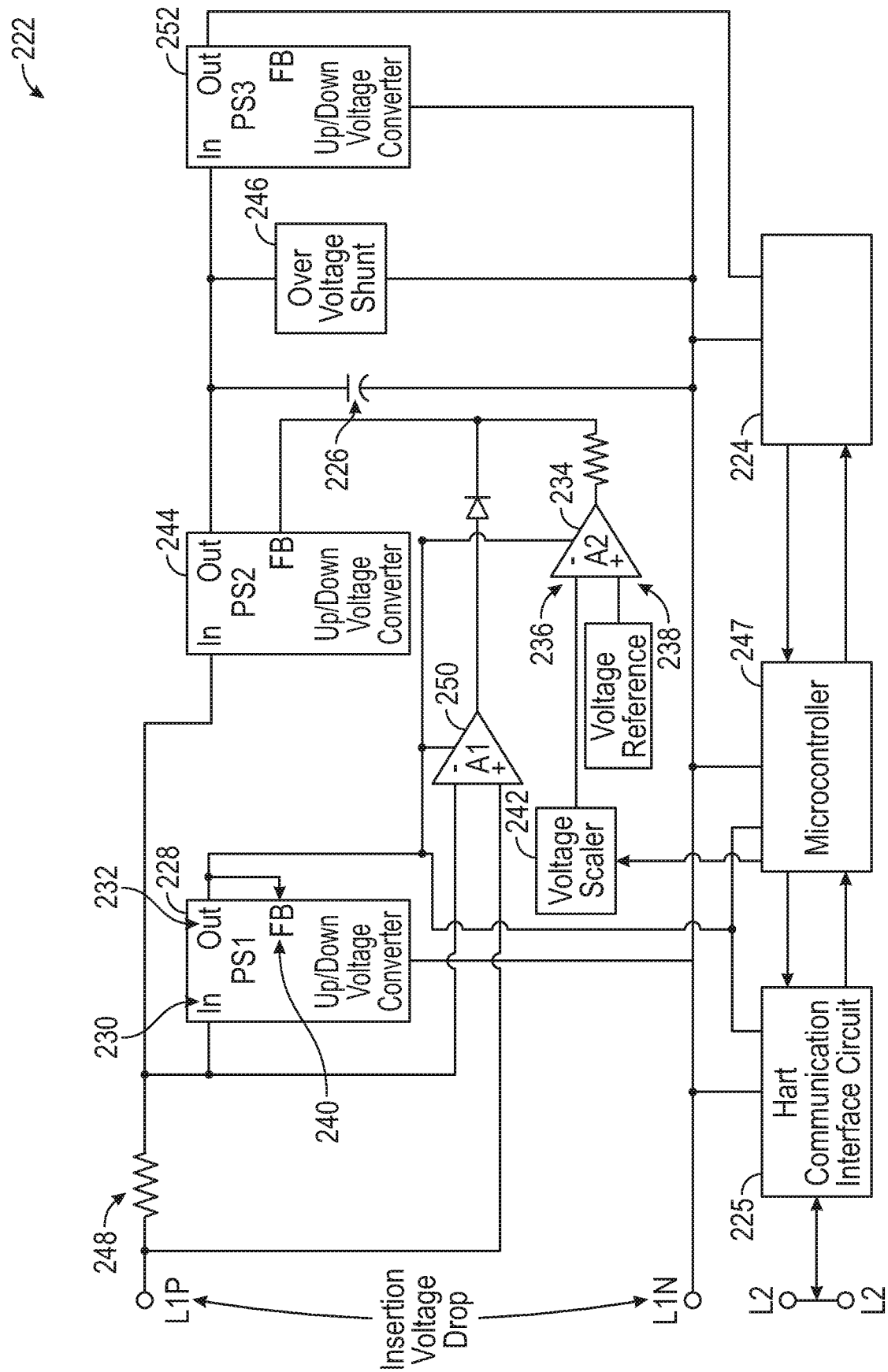
FIG. 3 is a system block diagram of a power management circuit.

FIG. 3 is a system block diagram of one embodiment of the power management circuit 222. It will be appreciated that, the power management circuit 222 can be used in any of a variety of process control systems such as illustrated in FIGS. 1 and 2, among other systems. The power management circuit 222 can be electrically connected between nodes L1P and L1N to facilitate the flow of loop current through the power management circuit 222 when the nodes L1P and L1N are connected in series with the loop wires 208a and 208b. The flow of loop current through the power management circuit 222 and can induce an insertion voltage across nodes L1P and L1N. Conventionally, this insertion voltage is insufficient to power the wireless adapter device 220. Therefore, the power management circuit 222 can include a voltage converter 228 connected to the insertion voltage at an input 230. An output 232 of the voltage converter 228 can be connected with certain electronic components of the wireless adapter device 220 such as an amplifier 234, a current loop amplifier 250, a HART interface logic device 225, and a microcontroller 247. The voltage converter 228 can convert the insertion voltage to an appropriate source voltage for powering each of the electronic components of the wireless adapter device 220.

The power management circuit 222 can include a wireless communication device 224. The wireless communication device 224 can be configured to provide wireless RF communications to transmit information (e.g., process variable information) between the wireless adapter device 220 and an RF based network in a facility. In certain embodiments, the wireless communication device 224 can include a transceiver that is supportive of any of a variety of wireless platforms such as IEEE 802.11, Bluetooth, microwave, infrared, or the like. In addition, the power management circuit 222 can further include HART interface logic 225 associated with the wireless communication device 224 to facilitate communication according to a HART protocol.

Referring again to FIG. 1 and continuing to refer to FIG. 2, the wired-HART protocol communicates digital data between devices such as field devices 102 and controllers 112 using Frequency Shift Keying (FSK). FSK is a modulation that is superimposed on top of the lower frequency analog control signal, namely the 4-20 ma signal commonly used by industrial measurement devices. This allows digital communications between devices 102, 112, without interfering with the main analog control signal. The HART interface logic 225 can communicate with the field devices 102 and controllers 112 using the wired-HART protocol, while the associated wireless communication device 224 can communicate with a WirelessHart network.

It will be appreciated that the power available from the loop current (e.g., insertion power) to power the wireless communication device 224 is generally the multiplicative product of the loop current and the insertion voltage. Typically, the wireless communication device 224 consumes more instantaneous power than is available as insertion power. The power management circuit 222 can include an electrical storage element device 226 that is configured to store insertion power and deliver the stored insertion power to the wireless communication device 224 as needed. Although the electrical storage device 226 is illustrated in FIG. 3 to comprise a supercapacitor, it will be appreciated that, any of a variety of alternative suitable electrical storage devices can be provided such as a general purpose energy storage capacitor or a battery, for example.

The electrical storage device 226 can be charged by a second voltage converter 244. As illustrated in FIG. 3, the electrical storage device 226 can be in electrical communication with output OUT of the second voltage converter 244. The second voltage converter 244 can transfer substantially all of the insertion power available, less the power consumed by the first voltage regulator 232, to charge the electrical storage device 226. Electrical energy can be provided from the electrical storage device 226 to meet the instantaneous and long term power requirements of the wireless communication device 224.

It will be appreciated that the storage capacity of the electrical storage device 226 can be many times greater than the insertion power such that charging of the electrical storage device 226 can take a relatively long period of time (potentially ranging from about one minute to a few hours). When the stored insertion power from the electrical storage device 226 becomes depleted, the voltage (e.g., radio voltage) of the electrical storage device 226 can also become depleted. To optimize the delivery of the stored insertion power from the electrical storage device 226 at a substantially constant voltage, the power management circuit 222 can include a third voltage converter 252 that is in electrical communication with each of the electrical storage device 226 and the wireless communication device 224. The third voltage converter 252 can generate a constant regulated radio voltage regardless of whether the electrical storage device 226 is charged to maximum capacity or is nearly depleted.

Conventionally, the insertion voltage has been regulated to a desired setpoint with a current shunt provided in parallel with the power management circuit 222. In such an arrangement, loop current is divided between the power management circuit 222 and the current shunt (e.g., a current divider circuit). If the loop current changes (e.g., due to a changing process variable), the current through the current shunt correspondingly changes to maintain the balance between the current shunt and the power management circuit thereby maintaining a constant insertion voltage drop. It will be appreciated however that any current that flows through the current shunt is not available to power the wireless adapter device and is wasted.

The second voltage converter 244 can be configured to regulate the insertion voltage without the need for a conventional-type current shunt. In some conventional configurations, voltage converters maintain a consistent voltage level at their output by varying the power transferred from their input. Generally, this conventional voltage regulator configuration is suitable where there is ample power provided at the input (e.g., to satisfy the power demands of a circuit electrically connected to the output of the voltage regulator). However, when the current and power provided at the input (e.g., input power) is limited, as is the case with the loop current into the power management circuit 222, and the demand on the output is higher than the input power, as is the case with the electrical storage device 226, a conventional voltage converter configuration may transfer too much power to the output thereby reducing the voltage at the input.

The second voltage converter 244, therefore, can be configured as a power converter to sense and control the insertion voltage at the input 230 and to balance the insertion power with the power transferred into the electrical storage device 226. In one embodiment, the insertion voltage can be compared with a reference voltage to regulate the insertion voltage. For example, as illustrated in FIG. 3, the amplifier 234 can be in communication with a feedback input FB of the second voltage converter. A reference voltage is shown to be connected to a positive input 238 of the amplifier 234. A variable scaler 242 can be connected to a negative input 236 of the amplifier 234. The insertion voltage can be provided to the amplifier 234 through the variable scaler 242 and the amplifier 234 can compare it to the reference voltage. The amplifier 234 can provide a control signal to the feedback input FB to regulate the insertion voltage to the reference voltage. It will be appreciated, however, that a power converter can be provided in any of a variety of suitable alternative arrangements to maintain an insertion voltage drop at a particular level.

The power management circuit 222 is therefore configured to control the insertion voltage while allowing full loop current (less the miniscule current consumed by the other circuits) to flow to the electrical storage device 226 (e.g., to power the wireless adapter device 220). Accordingly, the second voltage converter 244 can overcome some of the shortcomings of using a conventional current shunt to regulate the insertion voltage. For example, the insertion power (less the miniscule power consumed by the other circuits) generated from the insertion voltage and the loop current can be delivered to the electrical storage device 226. When the loop current changes (e.g., when a control process variable changes), the change in power is transmitted to the electrical storage device 226 via the second voltage converter 244 (e.g., the power management circuit 222 can track and adapt in real-time).

It will be appreciated that the power management circuit 222 can be configured as an "Energy Pump" circuit which converts the insertion voltage to a higher voltage and can also charge the electrical storage device 226 to a higher voltage. Since the precise amount of energy transfer is monitored and compared against a reference voltage (e.g., by the amplifier 234) the insertion voltage can be precise (DC voltage) and stable (AC noise) during the operation of the field device 202. It will also be appreciated that the power extracted from the insertion voltage can be regulated to maintain the loop insertion voltage at a constant value.

The variable scaler 242 can vary the voltage provided to the negative input 236 of the amplifier 234 to facilitate selective control of the insertion voltage. By controlling the insertion voltage, the power provided to the electrical storage device 226 can change when the loop current changes (e.g., when the process variable changes). For example, when the loop current increases, the insertion voltage can be increased to increase the insertion power provided to the electrical storage device 226. By increasing the insertion power, the electrical storage device 226 can be charged quickly thereby increasing the power available from the electrical storage device 226 for operating the wireless communication device 224.

The variable scaler 242 can therefore be controlled to maximize the insertion power provided to the electrical storage device 226. In one example, for a field device (e.g., 202) that is configured to operate at a 1 Volt DC ("VDC") insertion voltage and at a minimum of 3.5 mA, the power management circuit 222 can provide more power to the electrical storage device 226 than would be available from a conventional current shunting system (e.g., 3.5 mW). If the loop current increases to 20 mA, the power management circuit 222 can generate 20 mW of insertion power, without the variable scaler 242 changing the 1 VDC insertion voltage. However, if the variable scaler varies the insertion voltage to about 2.5 VDC, then the power management circuit 222 can generate about 50 mW of insertion power which, in some instances, is enough to power the wireless communication device 224 directly (e.g., without first charging the electrical storage device 226). It will be appreciated that a power management circuit can be configured to handle any of a variety of insertion voltages (e.g., 0.5 VDC, over 2.5 VDC).

In one embodiment, as illustrated in FIG. 3, the power management circuit 222 can include a microcontroller 247 coupled with the variable scaler 242. In one embodiment, the microcontroller 247 can control the variable scaler 242 based upon a predefined setpoint. In another embodiment, the microcontroller 247 can control the variable scaler 242 dynamically (e.g., according to an algorithm). It will be appreciated that the microcontroller 247 can include a microprocessor, an arithmetic logic unit, or any of a variety of other suitable electronic components. However, any of a variety of additional or alternative components can facilitate control of the variable scaler 242. It will be appreciated that the setpoint can be configured at time of installation, or can be dynamically configured such as with the microcontroller 247 or across a wireless communication network by a host system as required or desired.

It will be appreciated that the insertion voltage drop induced by the flow of current through the power management circuit 222 can provide an additional voltage drop to the process control system 200. When the wireless adapter device 220 is connected between nodes L1P and L1N, the magnitude of the insertion drop voltage should be such, that when the insertion drop voltage is combined with the other voltage losses in the process control system 200, the voltage of the power supply 214 is not exceeded. For example, the combined voltage losses across the loop wires 208a, 208b, 210a, 210b, the wireless adapter device 220, the field device 202, and the current sense resistor 218 should be maintained at or below the voltage of the power supply 214.

It will be appreciated that the voltage of the power supply 214 and corresponding voltage losses can vary for different process control system configurations. Conventionally, the insertion voltage drop on a power management circuit 222 is permanently set at a low level (e.g., about 1 VDC) in order to ensure compatibility with various process control system configurations. However, if these conventional power management circuits 222 are provided on a process control system with low cumulative voltage losses, insertion power can be lost. For example, if the power supply 214 can supply about a 5 VDC voltage, and the combined voltage losses of a process control system (ignoring the insertion voltage drop) total about 2 VDC, the process control system can accept an insertion voltage drop of up to about 3 VDC. However, if the insertion voltage drop of the conventional power management circuit has been set at about 1 VDC, the insertion power will be comparatively less than a conventional management circuit having an insertion voltage drop of about 3 VDC. Therefore, the power management circuit 222 can be configured to control the insertion voltage drop (e.g., stabilize, regulate) to maximize the insertion power for any of a variety of process control system configurations.

It will be appreciated that as the electrical storage device 226 reaches maximum capacity, the voltage across the electrical storage device 226 can rise above proper operating limits. Rather than shunting current and power away from the power management circuit 222 (e.g., with a current shunt), a voltage shunting circuit can be provided in communication with the electrical storage device 226. The voltage shunting circuit can be configured to prevent an over-voltage condition within the electrical storage device 226. In one embodiment, as illustrated in FIG. 3, a voltage shunt 246 can be provided in parallel with the electrical storage device 226, such that as the electrical storage device 226 reaches capacity, the voltage shunt 246 can bypass current and power to prevent the voltage across the electrical storage device 226 from further increasing. In such an embodiment, the power delivered from the output of the second voltage converter 244 (less the miniscule power consumed by the other circuits) can be shunted by the voltage shunt 246 to balance the power and regulate the voltage across the electrical storage device 226. As power is delivered from the electrical storage device 226 to the wireless communication device 224, the voltage shunt 246 can cease shunting until the electrical storage device 226 is at capacity again.

It will be appreciated to power various components of the power management circuit 222, a stable voltage can be provided from the insertion voltage drop. In one embodiment, as illustrated in FIG. 3, a third voltage converter 252 can be provided to create a constant regulated control voltage to power certain electronic components of FIG. 3.

The power management circuit 222 can provide fast deployment that allows the application of loop currents in excess of the loop current normal operating ranges (e.g., about 3.5-20 mA, up to about 130 mA). This fast deployment can allow a user installing wireless adapter device 220 to rapidly charge the electrical storage device to provide minimal delay after installation to power the wireless communication device 224. To facilitate this fast deployment, the power management circuit 222 includes a fast deployment circuit configured to sense a magnitude of the loop current, and when the magnitude of the loop current reaches a threshold value, maintain the voltage level at the input at an elevated level to facilitate a substantial increase in the charging power delivered to the electrical storage device 226. In one embodiment, the power management circuit 222 can include a sense resistor 248 and a loop current amplifier 250. The microcontroller 247 can monitor the loop current across the sense resistor 248 and compare it with a threshold value. When the magnitude of the loop current exceeds the threshold value, the microcontroller 247 can define a setpoint for maximum insertion voltage with using the variable scaler 242, and the power management circuit 222 can then receive maximum insertion power. In one embodiment, the microcontroller 247 can compare the loop current against a threshold value of 25 mA. When the loop current exceeds 25 mA for a period of time the variable scaler 242 can be set to provide a maximum insertion voltage drop.

The power management circuit 222 can include over-current protection. This over current protection can limit the amount of insertion power when an excessive amount of loop current is being provided to the power management circuit 222. To facilitate over-current protection the power management circuit 222 can include an over current protection circuit configured to sense the magnitude of the loop current and, when the magnitude of the loop current reaches an over-current threshold value, disable the second voltage converter 244. In one embodiment, over current protection circuit can include the sense resistor 248 and the loop current amplifier 250. The positive input and negative input of the loop current amplifier 250 can be electrically connected on opposite sides of the sense resistor 248 to monitor the magnitude of the loop current. If the loop current exceeds a maximum threshold, the output of the loop current amplifier can provide a signal to shut down the second voltage converter 244 thereby limiting the insertion power provided to the power management circuit 222. In one embodiment, the loop current amplifier 250 can compare the loop current against about a 130 mA threshold. When the loop current exceeds 130 mA, the loop current amplifier 250 can provide a signal to shut down the second voltage converter 244.

The power management circuit 222 can include a power save capability. The power management circuit 222 can monitor the loop current (e.g., through sense resistor 248). If the magnitude of the loop current is reduced to a negligible amount, the power management circuit 222 can power down all significant power consuming circuits to preserve the power stored in the electrical storage device 226. When the loop current regains a particular magnitude (e.g., greater than a negligible amount), the power management circuit 222 can return power to the circuits that were previously shut down. If a process control system has a power outage, this function can help ensure that the wireless adapter device 220 will be immediately available with the electrical storage device 226 at capacity when power returns. If a user has pre-charged the wireless adapter device 220 (e.g., in a lab), this feature can ensure that the wireless adapter device 220 will be fully powered and immediately available to begin radio communications when it is installed on a process control system.

The power management circuit 222 can include an instant-on function, whereby an auxiliary power is established to power the internal control circuitry before the electrical storage device 226 charges up.

The power management circuit 222 can include dynamic radio duty cycle management. In particular, the power management circuit 222 can inform a wireless communication network of the insertion power available to power the wireless communication device 224. Accordingly, the wireless communication network can dynamically configure a maximum radio duty cycle to match the insertion power available to power the wireless communication device 224. When the insertion power is elevated, a duty cycle can be increased to achieve faster update rates for changing process variables. However, when the insertion power is depleted, the duty cycle can be reduced to ensure that the power demand by the wireless communication network does not exhaust the storage capacity of the electrical storage device 226 thereby causing an ultimately loss of radio communication until the electrical storage device 226 can be recharged.

Figure 4:
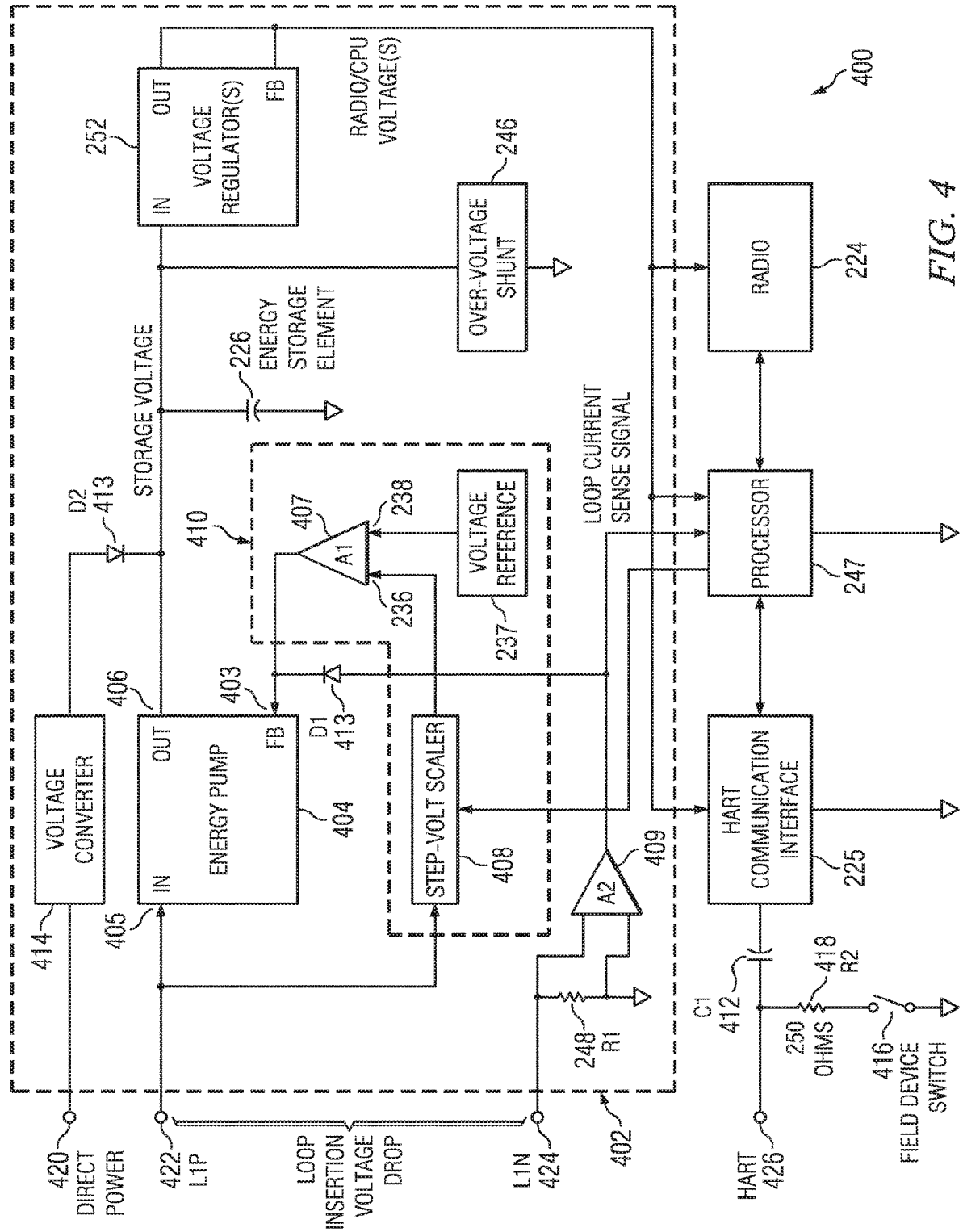
FIG. 4 is a system block diagram of a power management system.

Referring now to FIG. 4 and continuing to refer to FIG. 1 and FIG. 2, a power management system 400 is presented. The power management system 400 includes many of the elements presented and described for the power management circuit 222 presented in FIG. 3 and described in the above accompanying text. Therefore, for clarity of exposition, the differences between the elements of FIG. 3 and FIG. 4 are described below.

The power management circuit 402 of the power management system 400 includes an energy pump 404 having an input 405 in electrical communication with the UP 422 connector, a feedback input 403 for accepting a feedback sense from a control circuit, and an output 406 that provides a charging voltage to an energy storage element 226 and a voltage regulator 252. The energy pump 404 can be a voltage converter that receives a first voltage and converts it to a higher (or lower) voltage. The energy pump 404 is selectively controlled by the control circuit 410 that modulates the feedback sense. The control circuit 410 comprises a feedback amplifier 407 that has two inputs 236, 238 connected to a reference voltage 237 and the output of a scaler 408. The control circuit 410 modulates the feedback sense at least in part based on the loop current in the control loop to regulate the insertion voltage between L1P 422 and L1N 422. The The scaler 408 facilitates control of the insertion voltage by the microcontroller 247. This allows dynamic control of power management by the power management circuit 402. The loop insertion voltage can be regulated by balancing the energy extracted from the control loop with the energy available in the control loop. Because the current regulator 116 modulates the current in the control loop, for example between 4 mA and 20 mA, the amount of energy available in the control loop can change dynamically. The precise amount of energy transfer by the energy pump 404 is monitored by the feedback amplifier 407 that compares the reference voltage 237 against the insertion voltage and keeps the insertion voltage precise (DC voltage) and stable (AC noise.) No power from the control loop is wasted until the stored power in the energy storage element 226 reaches a maximum, resulting in efficient utilization of the available power in the control loop.

The scaler 408 can be dynamically controlled by the microcontroller 247. In some applications, for example if there is no IS barrier in the control loop, the insertion voltage can be set to a higher than normal value, for example 2.5 Volts. Setting the insertion voltage higher enables a rapid deployment mode, whereby the energy storage element 226 can be quickly charged to full capacity. Setting the insertion voltage higher enables the energy pump 404 to transfer more power from the control loop. More power can be available from the energy pump 404 and energy storage element 226, and the microcontroller 247 can increase the radio 224 transmission parameters, increasing the transmission rate and enabling more frequent communications across the radio link. The increased amount of power can allow the microcontroller 247 to run at a second operational mode, such as a high power mode. The scaler 408 can be a step-volt scaler, enabling insertion voltages at incremental steps between approximately 0.5 Volts and approximately 2.5 Volts in 0.5 Volt increments. The scaler 408 can be a digital or analogy scaler, enabling insertion voltages at various ranges and increments.

The power management circuit 402 can be connected in serial with a control loop of a controller 112, 212 and a field device 102, 202 (shown in FIG. 1 and FIG. 3). In this configuration, the power management circuit 402 can be connected in serial with one of the control loop wires 108, 110, 208, 210 using the UP 422 and L1N 424 connectors, for example as illustrated in FIG. 2.

The power management circuit 402 can also be connected with a battery (not shown) that directly powers the field device 102, 202. In this configuration, there is no controller 112, 212. Instead, a first terminal of a battery, for example the positive terminal, is connected to the direct power input 420. The second terminal of the battery, for example the negative terminal, is connected to the L1N 424 connector. The first terminal of the battery is also connected to one of the connection terminals 104 of the field device 102. The other connection terminal 106 is in electrical communication with the HART connector 426. Current for the control loop flows from the first terminal of the battery through the field device 102, is modulated by current regulator 116, that can also be a voltage or power regulator, and returns to the power management circuit 402 through the HART connector 426, through the internal current sense resistor 418 and field device switch 416, and through the sense resistor 248 to the second terminal of the battery.

The sense resistor 248 is a loop sense resistor in that it provides a way to produce a measurement of the amount of loop current in the control loop or current loop. To minimize voltage drop across the sense resistor 248, the sense resistor 248 can be a low value resistor, for example a 1 Ohm resistor with a ¼ Watt power rating. A loop current sense amplifier 409 connects to the sense resistor 248 and produces a loop current sense signal from the voltage drop, or loop current sense value, across the sense resistor 248. The loop current sense signal can be provided to the microcontroller 247. The loop current sense amplifier 409 can be connected through a blocking diode 413 to the feedback input 413 of the energy pump 404 to further modulate the feedback sense. In this configuration, a high value in the loop current sense signal indicates an unsafe or over-current condition for the power management circuit 402. The high value in the loop current sense signal can be configured to have a threshold that, when exceeded, shuts down the energy pump to prevent damage to the power management circuit 402.

When the power management circuit 402 is connect in serial with a control loop, the voltage drop across the sense resistor 248 provides a loop current sense value directly correlating to the current in the control loop passing through the power management circuit 402 between the L1N 424 connector and UP 422 connector. When the power management circuit 402 is utilizing the battery, the current passing through the sense resistor 248 includes both the current in the control loop and the current drawn from the battery by the power management circuit 402. The microcontroller 247 can selectively turn on and off the voltage converter 414. Note that the microcontroller 247 can be any kind of processor, CPU, ASIC, or processing logic and analog-to-digital converters, or combination of circuits. When the voltage converter 414 is turned on, the voltage converter 414 provides an electric charging current directly to the energy storage element 226 and voltage regulator 252. A blocking diode 413 prevents power from flowing back into the voltage converter 414, for example when the energy pump 404 is turned on. The amount of current and power drawn by the voltage converter 414 is dependent upon the current draw of the power consuming circuits 225, 247, 224. For example, if the radio 224 is transmitting and receiving wireless data, the radio 224 can draw electrical power from the stored power in energy storage element 226 through the voltage regulator 252. In response, the voltage converter 414 can draw power from the battery to recharge the energy storage element 226 or to directly provide charging voltage to the voltage regulator 252. The electrical return to the battery for the current drawn by both the power management circuit 402 and the power consuming circuits 225, 247, 224 is through the sense resistor 248. Therefore, when the microcontroller 247 selectively turns on the voltage converter 414, the sense resistor provides a measure of the total consumption of power by the power management system 400 and field device.

When the voltage converter 414 is turned off, the energy storage element 226 is the source of electrical power for both the power management circuit 402 and the power consuming circuits 225, 247, 224. When the voltage regulator 252 is off, the power management circuit 402 and power consuming circuits 225, 247, 224 are electrically isolated from the control loop and the sense resistor 248. The current flowing through the sense resistor 248 is the current in the control loop. The controller 247 can selectively turn on and off the voltage converter 414, perform measurements of the current flowing through the sense resistor 248, and obtain a diagnostic indication of the power usage in the power management system 400. The controller can 247 monitor the loop current flowing through the sense resistor 248 and selectively turn off components to reduce or disable the loop current. For example, the controller 247 can disable the radio 224, the HART communications interface 225, and the voltage converter 414, and the controller 247 can also create an open circuit condition in the field device switch 416.

By opening, or electrically opening, the field device switch 416, power to the field device 102, 202 is removed. The controller 247 can open the field device switch 416 if there is an electrical fault in the control loop, or if the power management circuit 402 is incorrectly connected to the battery or field device 102, 202. The controller can open the field device switch 416 to prevent damage to the power management system 400 in the event of a reverse connection of the battery, or an overvoltage condition, significantly reducing field return failures of components damaged by incorrect installation. The field device switch 416 can default to being open, allowing installation prior to powering the controller 247. Once powered, the controller 247 can momentarily close the field device switch 416 to test for incorrect connections or voltages without subjecting the rest of the power management circuit 402 to significant amounts of current.

The field device switch 416 provides a current return path for the control loop through the internal current sense resistor 418, or current sense resistor. The internal current sense resistor 418 can be 250 Ohms. An internal current sense resistor 418 having a resistance of 250 Ohms provides the proper impedance characteristics for transmitting and receiving HART communications between the HART communications interface logic 225 and the field device 102, 202. The HART communications interface logic 225 is capacitively connected to the control loop. The capacitor 412 blocks the DC component of the while passing the FSK signal of the HART protocol. Note that the capacitor 412 can be connected to any point in the control loop.

The controller 247 can open the field device switch 416 to remove power to the field device 102, 202 thereby placing the field device 102, 202 in a sleep mode. When the controller 247 requires information from the field device 102, 202, the controller 247 can close the field device switch 416 and wake the field device 102, 202 to retrieve the required information. Selectively removing power to the field device 102, 202 can substantially lengthen the useful life of a battery. Under software or remote wireless control through the radio 224, the power management system 400 can intermittently and briefly power up the field device 102, 202 through the field device switch 416, communicate with the field device 102, 202 to obtain a control process data, power down the field device 102, 202, and send the data or information across a wireless network.

What has been described above includes illustrative examples of certain components and methods. It is, of course, not possible to describe every conceivable combination of components or methodologies, but one of ordinary skill in the art will recognize that many further combinations and permutations are possible.

In particular and in regard to the various functions performed by the above described components, devices, circuits, systems and the like. The terms (including a reference to a "means") used to describe such components are intended to correspond, unless otherwise indicated, to any component which performs the specified function of the described component (for example, a functional equivalent), even though not structurally equivalent to the disclosed structure, which performs the function in the examples provided. In addition, while a particular feature may have been disclosed with respect to only one of several implementations, such feature may be combined with one or more other features of the other implementations as may be desired or advantageous for any given or particular application.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A system including a current loop in serial connection with a field device, the system comprising:
 a power management circuit connected in serial with the current loop and the field device, the power management circuit being configured to cause a regulated voltage drop across the serial connection at an insertion voltage, wherein the power management circuit is configured to output an electrical power derived from the insertion voltage, and wherein the power management circuit comprises:
  an energy pump that is a first voltage converter that receives a first voltage and converts the first voltage to a second voltage that is either higher or lower than the first voltage, wherein the energy pump includes an input for receiving at least a portion of the insertion voltage and an feedback input for accepting a feedback sense, the energy pump outputs a charging voltage based at least in part on the feedback sense, and the charging voltage is configured to source the electrical power output by the power management circuit; and
  a control circuit regulating the insertion voltage by modulating the feedback sense to the energy pump, wherein the control circuit modulates the feedback sense at least partially in response to an electrical change in the current loop;
 a power consuming circuit in communication with the power management circuit to receive the electrical power; and
 an electrical storage element in electrical communication with the energy pump, the electrical storage element configured to store the charging voltage as a stored power,
 wherein, to maintain the regulated voltage drop, the energy pump dumps the charging voltage into the electrical storage element.

2. The system of claim 1, wherein the power consuming circuit is selected from the group consisting of a wireless communication device, a Highway Addressable Remote Transducer ("HART") interface configured to communicate with the field device according to a HART protocol, and a processor.

3. The system of claim 1, wherein, when the power consuming circuit is switched off, the energy pump directs a full amount of the loop current to the electrical storage device to maintain the regulated voltage drop.

4. The system of claim 1, wherein the electrical storage element comprises at least one of a capacitor and a battery.

5. The system of claim 1, wherein the power management circuit further comprises:
 a voltage regulator in electrical communication with the electrical storage element, the voltage regulator configured to regulate the stored power and output the electrical power of the power management circuit.

6. The system of claim 1, wherein the power management circuit further comprises:
 a voltage shunting circuit in electrical communication with the electrical storage element, the voltage shunting circuit configured to prevent an over-voltage condition for the electrical storage element.

7. The system of claim 1, wherein the control circuit further comprises:
 a feedback amplifier configured to output the feedback sense to the energy pump, comprising:
  a first input configured to receive a reference voltage;
  a second input configured to receive a feedback voltage having a value correlating to a multiple of the insertion voltage; and,
  an output in electrical communication with the energy pump.

8. The system of claim 7, wherein the control circuit further comprises:
 a scaler configured to input at least a portion of the insertion voltage and output, to the second input of the amplifier, a feedback voltage that is a selectable multiple of the insertion voltage.

9. The system of claim 8, wherein the control circuit further comprises:
a processor configured to control the scaler.

10. The system of claim 7, wherein the power management circuit further comprises:
a loop sense resistor configured to provide a loop current sense of a current in the power management circuit; and,
a loop current sense amplifier configured to receive the loop current sense, and output a loop current sense signal.

11. The system of claim 10, wherein the loop current sense amplifier is in electrical communication with the energy pump, and wherein the loop current sense signal further modulates the feedback sense to disable the energy pump when the current the power management circuit exceeds an over-current threshold.

12. The system of claim 10, wherein the loop current sense amplifier is configured to provide a loop current sense signal corresponding to a loop current in the current loop, and further comprising:
a processor in electrical communication with the loop current sense amplifier, the processor is configured to receive the loop current sense signal.

13. The system of claim 12, wherein the processor operates in a fast-deployment mode by controlling a scaler and increasing the insertion voltage in response to a value of the loop current sense signal crossing a threshold, wherein the scaler is configured to input at least a portion of the insertion voltage and output, to the second input of the feedback amplifier, a feedback voltage that is a selectable multiple of the insertion voltage.

14. The system of claim 1, wherein the control circuit is configured to regulate the insertion voltage to between about 0.5 VDC and about 2.5 VDC.

15. The system of claim 1, further comprising:
a Highway Addressable Remote Transducer ("HART") interface configured to communicate with the field device according to a HART protocol, the HART interface configured to be capacitively coupled to the current loop.

16. The system of claim 1, wherein the field device is configured to receive a DC voltage from a battery, and further comprising:
a second voltage converter configured to input the DC voltage from the battery and output the charging voltage to the power management circuit.

17. The system of claim 16, wherein the second voltage converter and a first terminal of the field device are in electrical communication with a first terminal of the battery, and wherein the power management circuit further comprises:
a loop sense resistor in electrical communication with a second terminal of the battery, the loop sense resistor configured to provide a loop current sense of a current in the power management circuit; and,
a loop current sense amplifier configured to receive loop current sense, and output a loop current sense signal.

18. The system of claim 17, further comprising:
a current sense resistor in electrical communication with the second terminal of the field device; and,
a processor in electrical communication with the loop current sense amplifier, the processor is configured to receive the loop current sense signal, the processor is configured to disable the second voltage converter such that the current in the power management circuit is approximately a loop current of the battery in series with the field device, the loop sense resistor, and the current sense resistor.

19. The system of claim 18, further comprising:
a field device switch configured to selectively create an open circuit condition for the current sense resistor, and,
wherein the processor is configured to control the field device switch to selectively create the open circuit condition for the current sense resistor.

20. A method for managing power to a field device and a wireless communication device, the method comprising:
receiving a DC voltage from a battery, the battery configured to provide a loop current to the field device;
converting the DC voltage to a charging voltage, by an energy pump, wherein the converting is selectively disabled during an operation of measuring a loop current of the field device;
delivering the charging voltage to an electrical storage element;
storing the charging voltage as a stored power in the electrical storage element for delivery to the wireless communication device;
dumping, by the energy pump, the charging voltage into the electrical storage element to maintain a regulated voltage drop; and
in response to the electrical storage element reaching maximum capacity, bypassing, by a voltage shunting circuit in parallel with the electrical storage element, current and power to prevent voltage across the electrical storage element from further increasing.

21. A system including a current loop in serial connection with a field device, the system comprising:
a power management circuit connected in series with the current loop and the field device, the power management circuit being configured to cause a regulated voltage drop across the serial connection at an insertion voltage, wherein the power management circuit is configured to output an electrical power derived from the insertion voltage, and wherein the power management circuit comprises:
a first energy pump that is a first voltage converter and provides power to a control circuit and a power consuming circuit of the power management circuit;
a second energy pump that is a second voltage converter that receives a first voltage and converts the first voltage to a second voltage that is either higher or lower than the first voltage, wherein the second energy pump includes an input for receiving at least a portion of the insertion voltage and an feedback input for accepting a feedback sense, the second energy pump outputs a charging voltage based at least in part on the feedback sense, and the charging voltage is configured to source the electrical power output by the power management circuit; and
the control circuit regulating the insertion voltage by modulating the feedback sense to the second energy pump, wherein the control circuit modulates the feedback sense at least partially in response to an electrical change in the current loop;
the power consuming circuit in communication with the power management circuit to receive the electrical power; and
a power controller serially connected in the current loop, wherein the power management circuit is disposed in electrical serial connection between the field device and the control circuit, the power management circuit allowing direct communication between the field device and the power controller.

* * * * *